United States Patent
Kim et al.

(10) Patent No.: US 12,319,046 B2
(45) Date of Patent: Jun. 3, 2025

(54) COMPOSITE FIBER WEB HAVING SUPERIOR HEAT RESISTANCE AND SOUND ABSORPTION AND METHOD OF MANUFACTURING SAME

(71) Applicants: HYUNDAI MOTOR COMPANY, Seoul (KR); Kia Corporation, Seoul (KR); IKSUNG Co., LTD., Chungcheongbuk-do (KR)

(72) Inventors: Seong Je Kim, Yeosu-si (KR); Keun Young Kim, Suwon-si (KR); Ji Wan Kim, Hwaseong-si (KR); Tae Yoon Kim, Daejeon (KR); Jung Wook Lee, Bucheon-si (KR); Jae Sam Kim, Seoul (KR); Jong Hyuk Cha, Chungcheongbuk-do (KR)

(73) Assignees: Hyundai Motor Company, Seoul (KR); Kia Corporation, Seoul (KR); Iksung Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 18/424,657

(22) Filed: Jan. 26, 2024

(65) Prior Publication Data
US 2024/0217206 A1 Jul. 4, 2024

Related U.S. Application Data

(62) Division of application No. 16/913,242, filed on Jun. 26, 2020, now abandoned.

(30) Foreign Application Priority Data

Aug. 26, 2019 (KR) .................. 10-2019-0104246

(51) Int. Cl.
*B32B 37/02* (2006.01)
*B32B 5/02* (2006.01)
(Continued)

(52) U.S. Cl.
CPC .............. *B32B 5/26* (2013.01); *B32B 5/022* (2013.01); *B32B 37/02* (2013.01); *B32B 37/144* (2013.01);
(Continued)

(58) Field of Classification Search
CPC ........... B32B 5/26; B32B 5/022; B32B 37/02; B32B 27/144; B32B 37/206;
(Continued)

(56) References Cited

U.S. PATENT DOCUMENTS 3,595,946 A  7/1971  Joo
4,032,607 A  6/1977  Schulz
(Continued)

FOREIGN PATENT DOCUMENTS

EP  1199328 A1  4/2005
JP  2005-281490 A  10/2005
(Continued)

OTHER PUBLICATIONS

U.S. Final Office Action dated Nov. 17, 2023 issued in U.S. Appl. No. 16/913,242.
(Continued)

*Primary Examiner* — Linda L Gray
(74) *Attorney, Agent, or Firm* — Morgan Lewis & Bockius LLP (57) ABSTRACT

A composite fiber web having superior heat resistance and sound absorption and including a center layer containing a carbon fiber and a heat-resistant layer, and to a method of manufacturing the same. The method of the present invention can exhibit a fast manufacturing speed through a melt-blowing process that will generate economic benefits. The composite fiber web includes a composite layer and individual layers with various fiber diameters resulting in a superior sound absorption rate. The PET fiber included in
(Continued)

the heat-resistant layer of the composite layer is an environmentally friendly material with superior heat resistance due to the inclusion of ultrafine fiber. Also, the composite fiber web has superior strength, conductivity, and electromagnetic shielding and deodorization effects, which allows it to be widely utilized for sound absorption materials and in all application fields thereof.

7 Claims, 5 Drawing Sheets (51) Int. Cl.
  B32B 5/26      (2006.01)
  B32B 37/14     (2006.01)
  B32B 37/20     (2006.01)
  B32B 38/00     (2006.01)
  D01D 5/253     (2006.01)
  D01F 9/14      (2006.01)
  D04H 1/4242    (2012.01)
  D04H 5/04      (2006.01)
  D04H 5/08      (2012.01)

(52) U.S. Cl.
  CPC ........ *B32B 37/206* (2013.01); *B32B 38/0036* (2013.01); *D01D 5/253* (2013.01); *D01F 9/14* (2013.01); *D04H 1/4242* (2013.01); *D04H 5/04* (2013.01); *D04H 5/08* (2013.01); *B32B 38/164* (2013.01); *B32B 2250/40* (2013.01); *B32B 2262/0284* (2013.01); *B32B 2262/106* (2013.01); *B32B 2262/12* (2013.01); *B32B 2305/20* (2013.01); *B32B 2307/102* (2013.01); *B32B 2307/306* (2013.01); *B32B 2309/02* (2013.01); *B32B 2310/04* (2013.01); *B32B 2310/049* (2013.01); *B32B 2313/04* (2013.01); *B32B 2367/00* (2013.01); *D10B 2101/12* (2013.01); *D10B 2331/04* (2013.01)

(58) Field of Classification Search
  CPC ....... B32B 38/0036; D01D 5/253; D01F 9/14; D04H 1/4242; D04H 5/04; D04H 5/08
  See application file for complete search history.

(56) References Cited

U.S. PATENT DOCUMENTS

| | | |
|---|---|---|
| 4,389,387 A | 6/1983 | Miyamori |
| 4,405,548 A | 9/1983 | Cobb |
| 4,508,674 A | 4/1985 | Kuriki |
| 5,446,005 A | 8/1995 | Endo |
| 5,554,657 A | 9/1996 | Brownscombe |
| 8,389,667 B2 | 3/2013 | Christel |
| 8,735,457 B2 | 5/2014 | Booth |
| 10,167,379 B1 | 1/2019 | Barnell |
| 2004/0005446 A1 | 1/2004 | Chiu |
| 2015/0367596 A1 | 12/2015 | Yoon |
| 2020/0055276 A1* | 2/2020 | Katsuya ................ D04H 1/55 |

FOREIGN PATENT DOCUMENTS

| | | |
|---|---|---|
| JP | WO2018/199091 A | 11/2018 |
| KR | 10-1375442 B | 3/2014 |
| KR | 10-2014-0059141 A | 5/2014 |

OTHER PUBLICATIONS

U.S. Non-Final Office Action dated Jul. 17, 2023 issued in U.S. Appl. No. 16/913,242.
English machine translation of Abstract of JP 61296124 to Tai; Dec. 26, 1986, 1 page, 1986.
English machine translation of Abstract of JP S6278220 to Kazutoshi; Apr. 10, 1987, 1 page, 1987.

\* cited by examiner

COMPOSITE FIBER WEB HAVING SUPERIOR HEAT RESISTANCE AND SOUND ABSORPTION AND METHOD OF MANUFACTURING SAME

CROSS-REFERENCE TO RELATED APPLICATION

This application is a divisional patent application of U.S. patent application Ser. No. 16/913,242, filed on Jun. 26, 2020, which claims priority to and the benefit of Korean Patent Application No. 10-2019-0104246, filed on Aug. 26, 2019, which is incorporated herein by reference in their entireties.

FIELD

The present disclosure relates to a composite melt-blown fiber web having superior heat resistance and sound absorption and including a center layer containing a carbon fiber and a heat-resistant layer, and a method of manufacturing the same.

BACKGROUND

The statements in this section merely provide background information related to the present disclosure and may not constitute prior art.

Typically, external noise is introduced into vehicles through various paths during driving. Friction noise between tires and the ground, noise generated by high-temperature high-pressure combustion gas flow in the exhaust system, and engine transmission noise generated by engines and transmitted through vehicle bodies or the air are all transferred to the ears of persons in the vehicles, degrading the quietness within vehicles.

To reduce engine transmission noise, an engine cover or a hood insulator is generally used, but there are limits to removing the engine transmission noise to a desired level.

Hence, vehicles are provided with sound absorption materials on the front, left side and floor. For example, the sound absorption material is attached to a dash panel that separates the engine space and the cabin space in order to block the noise generated in the engine space. The sound absorption material is also attached to a side panel in order to block the noise introduced through the side of the vehicle body.

Examples of the sound absorption material typically include glass fiber, urethane foam, and recycled fabric felt. With respect to urethane foam, which is most commonly used, it has a foul odor and a risk of emitting toxic gas in the event of an accident due to the inflammability thereof, and when the foam is manufactured as a sound absorption material, it is difficult to shape.

Moreover, in recent years, national regulations associated with environmental friendliness and recyclability have progressively become more stringent, and fiber felt made from thermoplastic resins such as polypropylene (PP), rather than urethane foam, is being widely used. However, polypropylene-resin-based sound absorption materials have weak heat resistance, and a fiber material mixed therewith also has a limitation in that the fiber itself does not have heat resistance or flame retardancy and thus does not contribute to the properties thereof.

Therefore, there is a desire for a sound absorption material that is environmentally friendly, has superior heat resistance and sound absorption, and contributes to desired properties.

SUMMARY

The present disclosure provides a composite fiber web including a center layer containing a carbon fiber and a heat-resistant layer formed on at least one surface of the center layer.

The present disclosure is to provide a method of manufacturing the composite fiber web by continuously manufacturing and stacking the center layer and the heat-resistant layers through a melt-blowing process.

The present disclosure is not limited to the foregoing, and will be clearly understood through the following description and realized by the means described in the claims and combinations thereof.

The present disclosure provides a composite fiber web, including a center layer containing a carbon fiber, and a heat-resistant layer formed on at least one surface of the center layer.

The composite fiber web may further include an outer layer formed on the heat-resistant layer and including a nonwoven fabric.

The composite fiber web may include 20 to 35 wt % of the center layer, 51 to 69 wt % of the heat-resistant layer, and 11 to 14 wt % of the outer layer.

The heat-resistant layer may include 43 to 78 wt % of a polyethylene terephthalate (PET) fiber and 20 to 55 wt % of a staple fiber.

The heat-resistant layer may further include 2 to 5 wt % of an antioxidant.

The PET fiber may have a fiber diameter of 2 to 12 μm, an intrinsic viscosity (IV) of 0.43 to 0.5, and a melt flow rate (MFR) of 150 to 1500 g/10 min.

The staple fiber may be at least one of a hollow staple fiber, a modified cross-section hollow fiber, a modified cross-section fiber, or a cross-section fiber, and may have a thickness of 2.0 to 6.0 denier and a length of 18 to 68 mm.

The composite fiber web may have a weight of 580 to 690 $g/m^2$, a thickness of 20 to 26 mm, an average fiber diameter of 2 to 15 μm, a heat-resistant temperature of 225 to 235° C., and an average noise reduction coefficient (NRC) of 0.92 to 0.94.

The present disclosure provides a method of manufacturing the composite fiber web, which includes manufacturing a center layer containing a carbon fiber, manufacturing a heat-resistant layer, forming a composite layer by stacking the heat-resistant layer on at least one surface of the center layer, and stacking an outer layer on at least one surface of the composite layer.

Manufacturing the center layer may include extruding an isotropic pitch resin, spinning the extruded pitch resin to afford a pitch-based carbon fiber, subjecting the carbon fiber to infusibilization, carbonizing the carbon fiber subjected to infusibilization, and treating the carbonized carbon fiber with water vapor.

Spinning the extruded pitch resin may be performed at a spinning nozzle temperature 50 to 70° C. higher than a softening temperature of the pitch and at a hot-air temperature 30 to 50° C. higher than the softening temperature of the pitch.

Subjecting the carbon fiber to infusibilization may be performed at a temperature 20 to 30° C. higher than a softening temperature of the pitch and at a belt speed of 0.3 to 1 m/min in an oxygen gas atmosphere.

Carbonizing the carbon fiber may be performed at 900 to 1100° C. in an inert gas atmosphere.

Manufacturing the heat-resistant layer may include crystallizing a polyethylene terephthalate (PET) resin, drying the crystallized PET resin, extruding the dried PET resin, spinning the extruded PET resin to prepare a PET fiber, and mixing the PET fiber with a staple fiber.

Crystallizing the PET resin may be performed at a temperature of 110 to 130° C. for 3 to 6 hr to thereby crystallize a surface of the PET resin.

Drying the crystallized PET resin may be performed at a temperature of 150 to 170° C. for 3 to 4 hr.

Spinning the extruded PET resin may be performed at a spinning temperature of 200 to 300° C. and a spinning speed of 30 to 120 m/s.

Manufacturing the heat-resistant layer may further include performing heat treatment after the spinning, in which the heat treatment may be performed by heat-treating the spun PET fiber at a heat treatment temperature of 50 to 100° C. and a belt speed of 0.3 to 1 m/min.

The method of manufacturing the composite fiber web may include, on a continuously moving conveyor belt, manufacturing the heat-resistant layer, obtained by mixing a PET fiber resulting from crystallizing, drying, extruding and spinning a PET resin with a staple fiber, into a first web and a third web, manufacturing the center layer, obtained by subjecting a pitch-based carbon fiber resulting from spinning an extruded pitch resin to infusibilization, carbonization and water-vapor treatment, into a second web, and stacking the first web to the third web, which are continuously manufactured, in the order of first web/second web/third web.

The method of manufacturing a composite fiber web enables a center layer and heat-resistant layers to be continuously manufactured and stacked through a melt-blowing process, and the shortened manufacturing time generates economic benefits.

The composite fiber web also includes a composite layer and individual layers with various fiber diameters for a superior sound absorption rate. A polyethylene terephthalate (PET) fiber included in the heat-resistant layer of the composite layer in place of urethane is an environmentally friendly material, including an ultrafine fiber, thus exhibiting superior heat resistance.

Also, according to the present disclosure, not only does the composite fiber web have superior strength and conductivity, but it also has electromagnetic shielding and deodorization effects, and can thus be widely utilized for sound absorption materials and in all applicable fields thereof.

The effects of the present invention are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

To better understand the disclosure, various forms will now be described, given by way of example, reference being made to the accompanying drawings, in which.

The drawings described herein are for illustration purposes only and are not intended to limit the scope of the present disclosure in any way.

DETAILED DESCRIPTION

The features and advantages of the present disclosure will be more clearly understood from the following forms taken in conjunction with the accompanying drawings. The present disclosure is not limited to the forms disclosed herein, and may be modified into different forms. These forms are provided to thoroughly explain the present disclosure and to sufficiently transfer the spirit of the present disclosure to those skilled in the art. It should be understood that throughout the drawings, corresponding reference numerals indicate like or corresponding parts and features.

Throughout the drawings, the same reference numerals will refer to the same or like elements. It will be understood that, although terms such as "first" and "second" may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
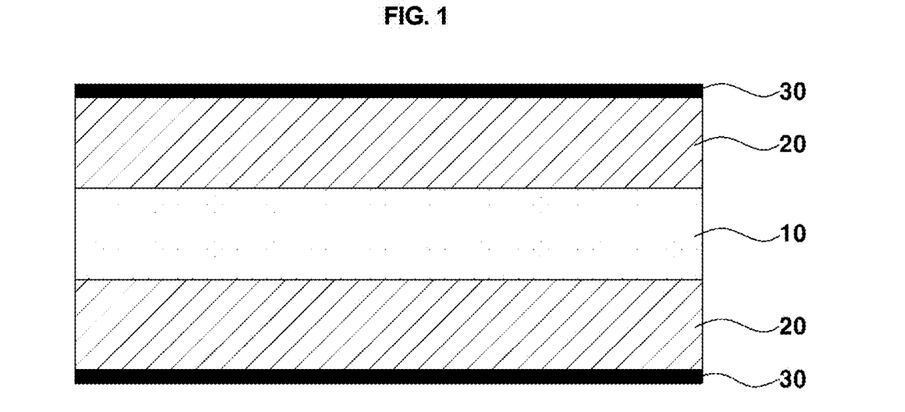
FIG. 1 is a cross-sectional view schematically showing a composite fiber web according to the present invention.

FIG. 1 is a cross-sectional view schematically showing a composite fiber web 1 according to one form of the present disclosure. With reference thereto, the composite fiber web 1 includes a center layer 10 containing carbon fiber and a heat-resistant layer 20 formed on at least one surface of the center layer 10. Also, the composite fiber web 1 may further include a nonwoven fabric layer 30 formed on the heat-resistant layer 20.

In one form of the present disclosure, the composite fiber web includes 20 to 35 wt % of the center layer, 51 to 69 wt % of the heat-resistant layer, and 11 to 14 wt % of the outer layer.

The amount of each component of the composite fiber web, which will be described below, is represented based on 100 wt % of the composite fiber web. If the amount basis thereof is changed, the new basis will always be set forth so that a person skilled in the art will clearly know the basis on which the amount is described.

Composite Fiber Web (1) Center Layer

In the composite fiber web 1 according one form of the present disclosure, the center layer 10 is not particularly limited, so long as it contains a carbon fiber.

The center layer of the present disclosure may include a carbon fiber obtained by spinning an anisotropic pitch or an isotropic pitch, and preferably a carbon fiber obtained by spinning an isotropic pitch, which has higher strength and thus superior durability.

According to the present disclosure, the amount of the center layer may be 20 to 35 wt % based on the total weight of the composite fiber web. If the amount thereof is less than 20 wt %, heat resistance may decrease. On the other hand, if the amount thereof exceeds 35 wt %, rigidity may decrease.

In the present disclosure, the thickness ratio of the center layer and the heat-resistant layer may be 1:1 to 1:4, for example, 1:1, 1:2 or 1:4, and particularly, the composite layer may include a heat-resistant layer/a center layer/a heat-resistant layer at a thickness ratio of 1:2:1, 1:1:1 or 2:1:2. If the thickness ratio is less than 1:1, rigidity may decrease. On the other hand, if the thickness ratio exceeds 1:4, heat resistance may decrease.

(2) Heat-Resistant Layer

The heat-resistant layer 20 according to an embodiment of the present disclosure is not particularly limited, so long as it is able to increase the heat resistance of the composite fiber web according to the present disclosure.

According to the present disclosure, the heat-resistant layer may be formed on at least one surface of the center layer 10 of the present disclosure, and particularly on the upper surface and the lower surface of the center layer.

The heat-resistant layer of the present disclosure may include materials such as a polyester fiber in order to increase heat resistance, and particularly a polyethylene terephthalate (PET) fiber, which has superior heat resistance and is environmentally friendly. The PET fiber according to the present disclosure may have a fiber diameter of 2 to 12 μm, an intrinsic viscosity (IV) of 0.43 to 0.5, and a melt flow rate (MFR) of 150 to 1500 g/10 min. If the amount of the fiber having a diameter less than 2 μm is 50% or more, the heat resistance may decrease. On the other hand, if the amount of the fiber having a diameter greater than 12 μm is 50% or more, the sound absorption rate may decrease. Also, if the intrinsic viscosity is less than 0.43, heat resistance may decrease. On the other hand, if the intrinsic viscosity exceeds 0.5, sound absorption may decrease. Also, if the melt flow rate is less than 150 g/10 min or exceeds 1500 g/10 min, heat resistance and sound absorption may decrease.

The heat-resistant layer according to the present disclosure may also include a staple fiber in order to increase the sound absorption rate and strength at low frequencies. The staple fiber according to the present disclosure may be at least one of a hollow staple fiber, a modified cross-section hollow fiber, a modified cross-section fiber, or a cross-section fiber, and preferably is a modified cross-section hollow fiber. According to the present disclosure, the staple fiber has a thickness of 2.0 to 6.0 denier, preferably 3.0 to 5.0 denier, and a length of 18 to 68 mm. If the thickness thereof is less than 2.0 denier, heat insulation properties may decrease. On the other hand, if the thickness thereof exceeds 6.0 denier, the staple fiber may not be uniformly distributed in the PET fiber. Also, if the length thereof is less than 18 mm, the staple fiber may not be uniformly distributed in the heat-resistant layer. On the other hand, if the length thereof exceeds 68 mm, staple fiber agglomeration may occur.

Also, the heat-resistant layer according to the present disclosure may further include an antioxidant in order to increase heat resistance. The antioxidant of the present disclosure may be a phenol-based antioxidant, an amine-based antioxidant, a sulfur-based antioxidant, a phosphorus-based antioxidant, and the like, and a phenol-based antioxidant is particularly useful as a primary antioxidant that increases heat resistance by suppressing oxidation by inhibiting a double chain reaction.

The heat-resistant layer according to the present disclosure may include 43 to 78 wt % of the PET fiber, 20 to 55 wt % of the staple fiber, and 2 to 5 wt % of the antioxidant. If the amount of the PET fiber is less than 43 wt %, the strength and sound absorption of the fiber web may decrease. On the other hand, if the amount thereof exceeds 78 wt %, the thickness, bulkiness, and restoring capability may decrease, undesirably deteriorating sound absorption. Also, if the amount of the staple fiber is less than 20 wt %, bulkiness and restoring capability may decrease, undesirably deteriorating sound absorption. On the other hand, if the amount thereof exceeds 55 wt %, the strength and sound absorption of the composite fiber web may decrease. Also, if the amount of the antioxidant is less than 2 wt %, heat resistance may decrease. On the other hand, if the amount thereof exceeds 5 wt %, sound absorption may decrease.

The amount of the heat-resistant layer according to the present disclosure may be 51 to 69 wt % based on the total weight of the composite fiber web. If the amount thereof is less than 51 wt % or exceeds 69 wt %, heat resistance and sound absorption may decrease.

The thickness of the heat-resistant layer according to the present disclosure is the same as described in connection with the center layer above.

(3) Outer Layer

The outer layer 30 according to an embodiment of the present disclosure is not particularly limited, so long as it has heat resistance and self-extinguishing properties.

The outer layer according to the present disclosure may include a nonwoven fabric, and examples of the nonwoven fabric may include a PET spunbond nonwoven fabric, a PET needle-punched nonwoven fabric, and a chemical nonwoven fabric, and preferably useful as a flame-retardant chemical nonwoven fabric is a PET chemical nonwoven fabric.

The amount of the outer layer according to the present disclosure may be 11 to 14 wt %. If the amount thereof is less than 11 wt % or exceeds 14 wt %, heat resistance and sound absorption may decrease.

(4) Composite Fiber Web

The composite fiber web manufactured according to one form of the present disclosure has a weight of 580 to 690 g/m$^2$, a thickness of 20 to 30 mm, a fiber diameter of 2 to 15 μm and a specific surface area of 900 to 2,500 m$^2$/g. If the weight thereof is less than 580 g/m$^2$, sound absorption may decrease, whereas if the weight thereof exceeds 690 g/m$^2$, the thickness thereof may increase and thus processability may decrease. Also, if the thickness thereof is less than 20 mm, sound absorption may decrease, whereas if the thickness thereof exceeds 30 mm, processability may decrease. Also, if the fiber diameter thereof is less than 2 μm, heat resistance may decrease, whereas if the fiber diameter thereof exceeds 15 μm, sound absorption may decrease. Also, if the specific surface area thereof is less than 900 m$^2$/g, adsorption and deodorization performance may decrease, whereas if the specific surface area thereof exceeds 2,500 m$^2$/g, rigidity may decrease.

Specifically, the composite fiber web according to the present disclosure is configured to include the center layer and the heat-resistant layer at a predetermined ratio and having predetermined diameters, in which the heat-resistant layer includes the PET fiber and the staple fiber, having predetermined diameters, at a predetermined ratio. The composite fiber web has a heat-resistant temperature of 225 to 235° C. and an average noise reduction coefficient (NRC) of 0.92 to 0.94, thus exhibiting superior heat resistance (a heat-resistant temperature of 80° C. or more) and sound absorption (NRC of 0.1 or more) compared to bases for use in conventional sound absorption materials. The composite fiber web having a specific ratio according to the present disclosure has not only heat resistance and sound absorption but also high durability and conductivity, and may thus be widely utilized for sound absorption materials and in all application fields thereof.

Figure 2:
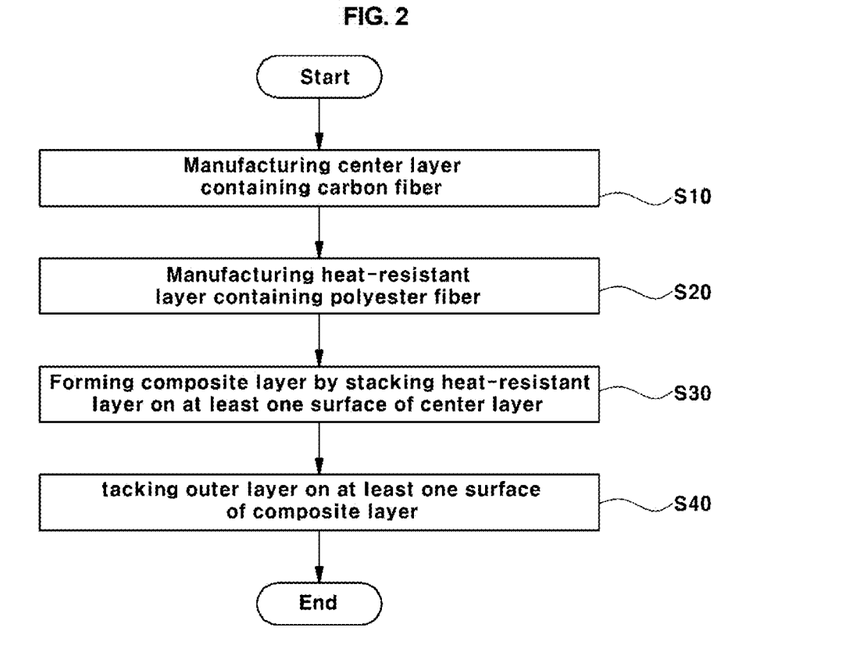
FIG. 2 is a flowchart showing a process of manufacturing a composite fiber web according to the present disclosure.

FIG. 2 is a flowchart showing the process of manufacturing the composite fiber web 1 according to the present disclosure. With reference thereto, the method of the present disclosure includes manufacturing a center layer containing a carbon fiber (S10), manufacturing a heat-resistant layer containing a polyester fiber (S20), forming a composite layer by stacking the heat-resistant layer on at least one surface of the center layer (S30) and stacking an outer layer on at least one surface of the composite layer (S40).

Figure 3A:
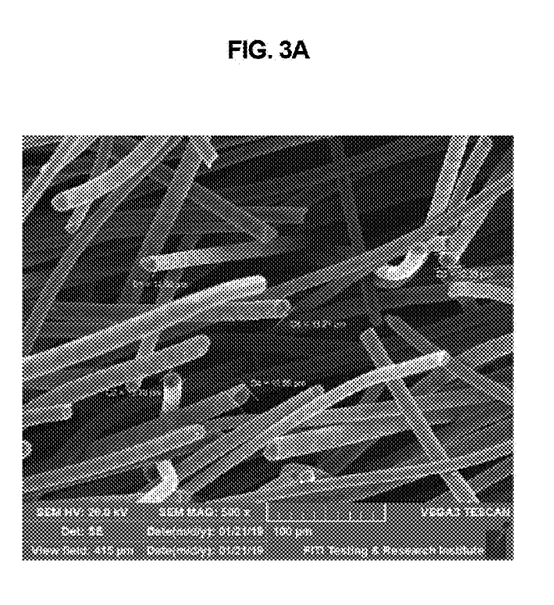
FIG. 3A is a microscope image showing the center layer according to the present disclosure.

Manufacturing the center layer (S10), as shown in FIG. 3A, involves manufacturing a center layer containing a carbon fiber. Specifically, manufacturing the center layer includes extruding an isotropic pitch resin, spinning the extruded pitch resin to afford a pitch-based carbon fiber, subjecting the carbon fiber to infusibilization, carbonizing the carbon fiber subjected to infusibilization, and treating the carbonized carbon fiber with water vapor.

The material for the carbon fiber included in the center layer according to the present disclosure is preferably an isotropic pitch resin, which has a high modulus value to thus exhibit high rigidity, no thermal deformation even at high temperatures, and ability to be manufactured to have the desired properties depending on the manufacturing method. The isotropic pitch resin according to the present disclosure may be obtained from coal tar and petroleum residue oil.

The isotropic pitch resin prepared above is extruded and spun to obtain a pitch-based carbon fiber. In the present disclosure, the pitch resin is spun through a melt-blown spinning process to form a thin fiber using traction at the point of contact with the polymer melt discharged from the spinning nozzle by jetting high-speed hot air to the air nozzles of knife edges facing each other at a predetermined angle. The pitch used in the present disclosure may have a softening temperature of 190 to 210° C., and thus the spinning process may be performed at a nozzle temperature 50 to 70° C. higher than the softening temperature of the pitch and at a hot-air temperature 30 to 50° C. higher than the softening temperature of the pitch. If the nozzle temperature is less than 50° C. higher than the softening temperature of the isotropic pitch, the pitch may not melt due to the low temperature. On the other hand, if the nozzle temperature is more than 70° C. higher than the softening temperature of the isotropic pitch, it is difficult to perform a spinning process due to carbonization. Also, if the hot-air temperature is less than 30° C. or more than 50° C. higher than the softening temperature of the isotropic pitch, a drawing process may not proceed properly upon pitch spinning.

Next, the pitch-based carbon fiber thus spun and manufactured is subjected to infusibilization. Specifically, the spun carbon fiber is stacked in the form of a sheet through a melt-blowing collector and then subjected to infusibilization. In the present disclosure, infusibilization is intended to impart thermal stability to the carbon fiber before carbonization of the carbon fiber, in which oxygen molecules diffuse/move toward the core of fiber strands and thus function as a crosslinker, thereby enhancing both the physical strength and the thermal stability of the spun carbon fiber. Accordingly, the carbon fiber is subjected to infusibilization at a temperature 20 to 30° C. higher than the softening temperature of the pitch and a belt speed of 0.3 to 1 m/min in an oxygen gas atmosphere. If the above processing temperature is less than 20° C. or more than 30° C. higher than the softening temperature of the pitch, infusibilization may not occur, undesirably deteriorating physical strength and thermal stability. Moreover, since the carbon fiber included in the center layer is manufactured on a continuously moving conveyor belt, if the belt speed is less than 0.3 m/min or exceeds 1 m/min, infusibilization may not proceed properly.

Next, the carbon fiber subjected to infusibilization is carbonized. In the present disclosure, the carbonization process enables hetero atoms (H, N, O, S, and the like) to be removed from the pitch-based material. Thus, the carbon fiber subjected to infusibilization may be carbonized at a temperature of 900 to 1100° C. for 30 sec to 5 min in an inert gas atmosphere. Here, if the processing temperature is lower than 900° C. or higher than 1100° C., the carbonization process may not proceed efficiently. Also, if the processing time is shorter than 30 sec or longer than 5 min, the carbonization process may not proceed efficiently.

Finally, the carbonized carbon fiber may be treated with water vapor. In the present disclosure, water-vapor treatment enables surface activation, and additionally, in order to increase adsorption properties before and after the carbonization of the carbon fiber, the carbon fiber may be activated by the addition of oxidative gas or reactive or chemical material to form pores. Here, the carbon fiber may be activated by adjusting the draw ratio in the range of 1.0 to 5.0, and the specific surface area of the activated carbon fiber may be 900 to 2,500 m$^2$/g.

Figure 3B:
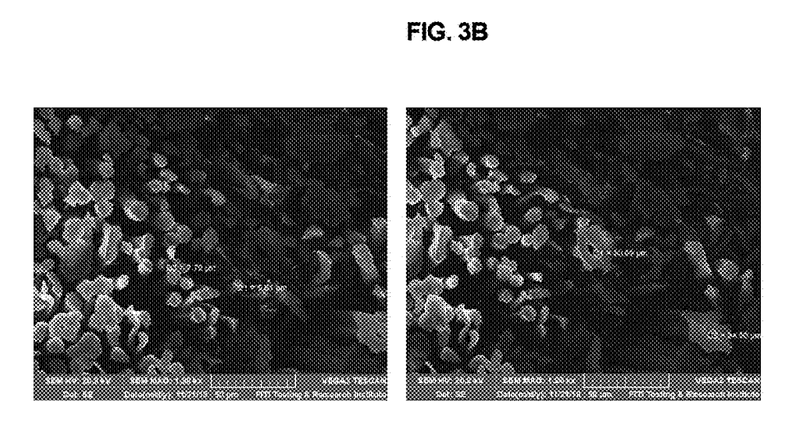
FIG. 3B is microscope images showing the heat-resistant layer according to the present disclosure.

Manufacturing the heat-resistant layer (S20) as shown in FIG. 3B involves manufacturing the heat-resistant layer containing a polyester fiber. Specifically, crystallizing a polyethylene terephthalate (PET) resin, drying the crystallized PET resin, extruding the dried PET resin, spinning the extruded PET resin to afford a PET fiber, and mixing the PET fiber with a staple fiber are performed.

Crystallizing the PET resin involves pre-crystallizing the surface of the PET resin in order to inhibit PET resin chips from sticking together and agglomerating when the PET resin is rapidly introduced at a high temperature for extrusion and spinning. According to the present disclosure, the surface of the PET resin may be crystallized at a temperature of 110 to 130° C. for 3 to 6 hr. If the crystallization temperature is lower than 110° C., crystallization does not occur and sticking may take place upon spinning. On the other hand, if the temperature is higher than 130° C., spinning may not occur due to carbonization, discoloration and sticking. Also, if the crystallization time is shorter than 3 hr, crystallization does not occur, whereas if the time exceeds 6 hr, spinning may not occur due to carbonization, discoloration and sticking.

The crystallized PET resin is dried in order to inhibit the molecular weight of the PET resin from decreasing due to hydrolysis by water in the air before extruding and spinning the PET resin and to make the molecular weight difference between PET resin chips uniform. According to the present disclosure, the PET resin may be dried at 150 to 170° C. for 3 to 4 hr, whereby the water content in the PET resin may be controlled to 50 ppm or less. If the water content exceeds 50 ppm, the drawing process does not proceed properly due to the molecular weight difference during spinning, or the spinning process may not occur efficiently. If the drying temperature is lower than 150° C., the drying process does not proceed properly and thus the water content may become 50 ppm or more, whereas if the drying temperature is higher than 170° C., carbonization, discoloration and sticking may occur due to the high temperature, making it impossible to perform the spinning process. Also, if the drying time is less than 3 hr, the water content may be 50 ppm or more, and thus the spinning process may not occur efficiently.

The dried PET resin is extruded and spun to obtain a PET microfiber. In the present disclosure, the PET resin may be spun at a spinning temperature of 200 to 300° C. and a spinning speed of 30 to 120 m/s. If the spinning temperature is lower than 200° C., the drawing process may not proceed properly, undesirably deteriorating heat resistance and sound absorption. On the other hand, if the spinning temperature is higher than 300° C., the nozzle may become clogged due to carbonization inside the extruder. Also, if the spinning speed is less than 30 m/s or exceeds 120 m/s, the drawing process may not proceed properly, undesirably deteriorating heat resistance and sound absorption. Moreover, heat treatment may be further performed after the spinning process according to the present disclosure. The heat treatment process is capable of improving the thermal stability of the PET fiber by passing the spun PET fiber through a stabilization furnace to heat-treat the surface thereof. The spun PET fiber may be heat-treated at a temperature of 80 to 120° C. and a belt speed of 0.3 to 1 m/min. If the heat treatment temperature is lower than 80° C., heat treatment may not proceed properly, undesirably deteriorating heat resistance. On the other hand, if the heat treatment temperature is higher than 120° C., the fiber may break down due to the high temperature, undesirably deteriorating the sound absorption rate and rigidity. Also, if the belt speed is less than 0.3 m/min or exceeds 1 m/min, heat treatment may not proceed properly, undesirably deteriorating heat resistance and sound absorption.

The PET fiber thus spun and heat-treated with the staple fiber may be mixed with the staple fiber in order to supplement the insufficient performance of the PET fiber, namely the strength thereof and the sound absorption rate thereof at a low frequency. In the present disclosure, the fiber-mixing process may be carried out through air carding or air blowing. The content of the staple fiber mixed therewith is the same as described above.

Figure 4:
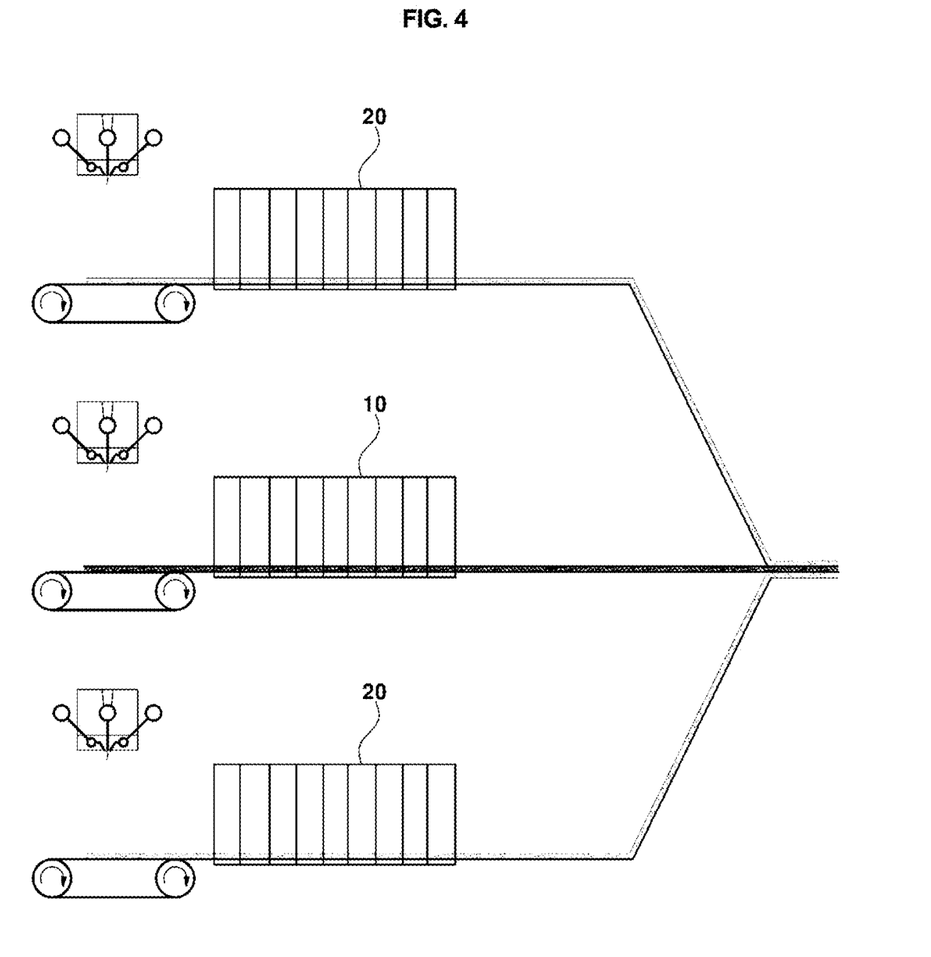
FIG. 4 shows a vertical melt-blown manufacturing apparatus according to the present disclosure, by which the first web to the third web are continuously stacked in the order of first web/second web/third web.

Forming the composite layer (S30) may be performed by stacking the heat-resistant layer on at least one surface of the center layer. Preferably, the composite layer is configured such that the heat-resistant layer is stacked on the upper and lower surfaces of the center layer. In forming the composite layer according to the present disclosure, as shown in FIG. 4, the center layer and the heat-resistant layers are sequentially spun and stacked on respective conveyor belts through at least three melt-blown spinning T-dies (nozzles) using a vertical melt-blown manufacturing apparatus. Specifically, forming the composite layer includes, on the continuously moving conveyor belt of the vertical melt-blown manufacturing apparatus, manufacturing the heat-resistant layer, obtained by mixing the PET fiber resulting from crystallizing, drying, extruding and spinning the PET resin with the staple fiber, into a first web and a third web; manufacturing the center layer, obtained by subjecting the pitch-based carbon fiber resulting from spinning the extruded pitch resin to stacking, infusibilization, carbonization and water-vapor treatment, into a second web; and stacking the first web to the third web, which are continuously manufactured, in the order of first web/second web/third web. According to the present disclosure, the method of manufacturing the composite fiber web is capable of continuously manufacturing and stacking the center layer and the heat-resistant layers using a melt-blowing process, thus exhibiting a fast manufacturing speed and generating economic benefits.

Stacking the outer layer (S40) involves stacking the outer layer on at least one surface of the composite layer. This step is performed to further increase heat resistance by stacking the outer layer on the upper and lower surfaces of the composite layer manufactured through the melt-blowing process. This stacking process is a typical technique that may be used in the art of the present disclosure, and is not particularly limited, so long as the outer layer may be stacked. The components for the stacked outer layer are the same as those described for the outer layer above.

A better understanding of the present disclosure will be given through the following examples, which are merely set forth to illustrate the present disclosure but are not to be construed as limiting the scope of the present disclosure.

Example 1

(S10) 20 kg of an isotropic pitch resin was prepared from coal tar and petroleum residue oil. Thereafter, the isotropic pitch resin was extruded and spun. Here, the softening temperature of the isotropic pitch resin was 200° C., and thus the isotropic pitch resin was spun at a nozzle temperature of 260° C. and a hot-air temperature of 240° C., thereby obtaining a pitch-based carbon fiber. Thereafter, the pitch-based carbon fiber was subjected to infusibilization at a temperature of 230° C. and a belt speed of 0.9 m/min in an oxygen gas atmosphere. Thereafter, the carbon fiber subjected to infusibilization was carbonized at 1,000° C. for 1 to 2 min in an inert gas (nitrogen gas) atmosphere to remove impurities. Finally, the carbonized carbon fiber was activated with water-vapor treatment to manufacture a center layer including a carbon fiber web of 200 g/m².

(S20) 500 kg of a polyethylene terephthalate (PET) resin having a fiber diameter of 10 μm, an intrinsic viscosity (IV) of 0.43 and a melt flow rate of 250 g/10 min was prepared and treated at 130° C. for 5 hr to crystallize the surface of the PET resin. Thereafter, the crystallized PET resin was dried at 160° C. for 4 hr to thus inhibit hydrolysis thereof. Thereafter, the dried PET resin was extruded and spun at a temperature of 280° C. and a spinning speed of 50 m/s to obtain a PET fiber. The PET fiber was subjected to surface heat treatment for thermal stabilization at a heat treatment temperature of 90° C. and a belt speed of 0.9 m/min using a thermal stabilization furnace. Thereafter, as a PET-based modified cross-section hollow fiber, a staple fiber having a thickness of 4 denier and a length of 38 mm was prepared, and 35 wt % of the staple fiber was mixed with 65 wt % of the heat-treated PET fiber to manufacture a heat-resistant layer including a PET melt-blown fiber web of 200 g/m$^2$.

(S30) On the continuously moving conveyor belt of a vertical melt-blown manufacturing apparatus, the heat-resistant layer obtained in S20 was manufactured into a first web and a third web. Also, the center layer obtained in S10 was manufactured into a second web. Thereafter, taking either the first web or the third web, which were continuously manufactured, a composite layer was manufactured by stacking in the order of first web/second web/third web at a thickness ratio of 1:1:1.

(S40) The upper and lower surfaces of the composite layer were laminated with a chemical nonwoven fabric of 40 g/m$^2$, thereby manufacturing a composite fiber web in which the center layer accounted for 29.4 wt % thereof, the two heat-resistant layers accounted for 58.8 wt % thereof, and the outer layers accounted for 11.8 wt % thereof, and having a total weight of 680 g/m$^2$, an average fiber diameter (a carbon fiber web and a PET melt-blown fiber web) of 2 to 15 μm and a thickness of 25 mm.

Example 2

A composite fiber web in which a center layer accounted for 34.5 wt % thereof, two heat-resistant layers accounted for 51.7 wt % thereof, and outer layers accounted for 13.8 wt % thereof, and having a total weight of 580 g/m$^2$ and a thickness of 20 mm was manufactured in the same manner as in Example 1, with the exception of the heat-resistant layer including a PET melt-blown fiber web of 150 g/m$^2$.

Example 3

A composite fiber web in which a center layer accounted for 20.5 wt % thereof, two heat-resistant layers accounted for 68.5 wt % thereof and outer layers accounted for 11 wt % thereof, and having a total weight of 730 g/m$^2$ and a thickness of 22 mm was manufactured in the same manner as in Example 1, with the exception of the center layer including a carbon fiber web of 150 g/m$^2$ and the heat-resistant layer including a PET melt-blown fiber web of 250 g/m$^2$.

Example 4

A composite fiber web having a total weight of 690 g/m$^2$, an average fiber diameter (a carbon fiber web and a PET melt-blown fiber web) of 3 to 15 μm and a thickness of 26 mm was manufactured in the same manner as in Example 1, with the exception of having a PET fiber obtained using a PET resin having an intrinsic viscosity (IV) of 0.46 was applied.

Example 5

A composite fiber web having a total weight of 685 g/m$^2$, an average fiber diameter (a carbon fiber web and a PET melt-blown fiber web) of 3 to 15 μm and a thickness of 25 mm was manufactured in the same manner as in Example 1, with the exception of having a PET fiber obtained using a PET resin having an intrinsic viscosity (IV) of 0.50 was applied.

Comparative Example

A PET fiber web having a total weight of 700 g/m$^2$, a thickness of 22 mm and an average fiber diameter of 3 to 10 μm was manufactured from a fiber obtained by melt-spinning a typical PET fiber.

Test Example 1—Evaluation of Average Fiber Diameter and Superior Sound Absorption and Heat Resistance The composite fiber web of Example 1 and the PET fiber web of the Comparative Example were compared for the average fiber diameter, sound absorption and heat resistance.

In Test Example 1, the fiber diameter was measured in accordance with KS K ISO 1973 in a manner in which the weight of the conditioned fiber was measured, the line density was calculated, an electron microscope image was obtained, and the diameters of 20 or more samples were measured and averaged.

In Test Example 1, heat resistance was evaluated by measuring the maximum temperature at which there were no changes in color and outer appearance after 24 hr from 130° C. and elevating the temperature by 10° C. to thus determine the maximum temperature.

In Test Example 1, sound absorption was evaluated in a manner in which a test sample having a size of 1 m×1.2 m was placed in a chamber, 15 sound sources from 400 Hz to 10,000 Hz were input and the sound absorption rate of the material for reverberation thereof was measured.

The results of measuring the weight, thickness and average fiber diameter of Example 1 and the Comparative Example are shown in Table 1 below.

TABLE 1

| No. | Example 1 | Comparative Example |
|---|---|---|
| Construction | PET fiber web + carbon fiber web + PET fiber web | PET fiber web |
| Weight (g/m$^2$) | 680 | 700 |
| Thickness (mm) | 25 | 22 |
| Average fiber diameter (μm) | 2 to 15 | 3 to 10 |

The results of measuring the heat resistance and sound absorption of Example 1 and Comparative Example are shown in Tables 2 and 3, respectively.

TABLE 2

| No. | Example 1 | Comparative Example |
|---|---|---|
| Maximum temperature at which heat resistance is maintained | 230° C. | 150° C. |

TABLE 3

| | (FREQ [Hz]) | | | | | | | | | | | | | |
|---|---|---|---|---|---|---|---|---|---|---|---|---|---|---|
| | 500 | 630 | 800 | 1k | 1.25k | 1.6k | 2k | 2.5k | 3.15k | 4k | 5k | 6.3k | 8k | 10k |
| Example 1 | 0.55 | 0.72 | 0.88 | 0.95 | 0.98 | 0.99 | 1.02 | 1.08 | 1.03 | 1.05 | 1.05 | 1.06 | 1.04 | 1.07 |
| Comparative Example | 0.43 | 0.61 | 0.80 | 0.90 | 0.92 | 0.95 | 1.00 | 1.02 | 0.98 | 0.99 | 0.99 | 1.00 | 1.00 | 1.02 |

As is apparent from Table 1, the composite fiber web of Example 1 of the present disclosure was slightly thicker (by 3 mm) than that of the Comparative Example, but the average fiber diameter was thinner and the weight was less. When the composite fiber web of the present disclosure is used as a sound absorption material for vehicles and the like, it can be confirmed that it is advantageous with respect to fuel efficiency. As is apparent from Table 2, the heat-resistant temperature of Example 1 was determined to be 230° C., which is 80° C. higher than that of the Comparative Example.

Figure 5:
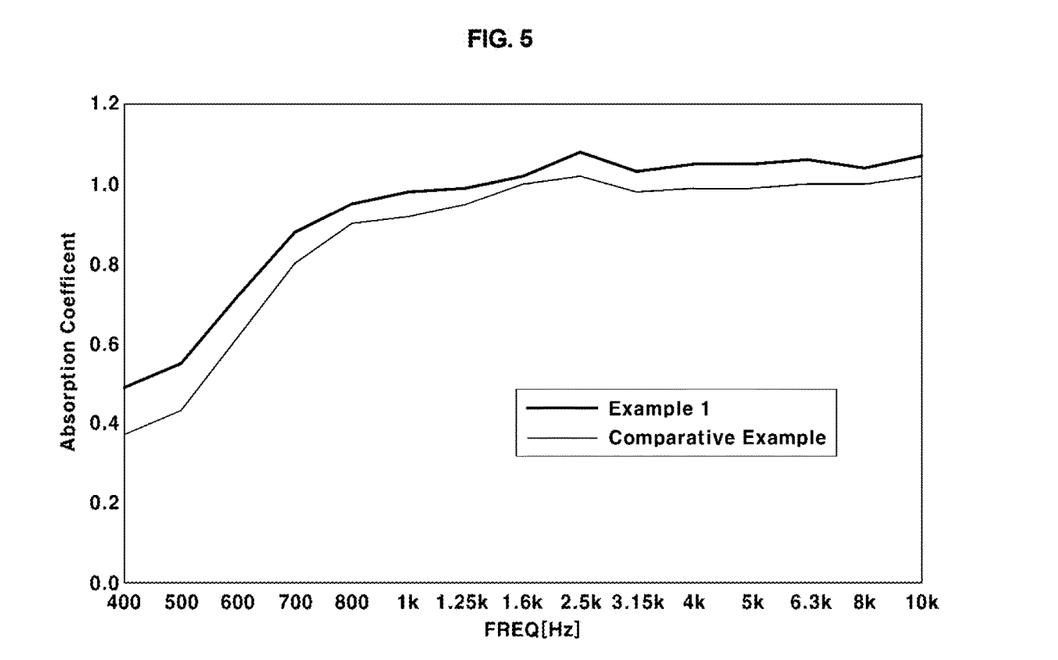
FIG. 5 is a graph showing the sound absorption coefficient depending on the frequency of Example 1 according to the present disclosure and the Comparative Example.

With reference to Table 3 and FIG. 5, the sound absorption coefficient at each frequency was higher in Example 1 than in the Comparative Example.

Therefore, compared to the monolayered PET fiber web, the composite fiber web according to the present disclosure was configured to include the composite layer with individual layers having various fiber diameters, thereby exhibiting a superior sound absorption rate and higher heat resistance by virtue of the materials of the individual layers.

Test Example 2—Measurement of Sound Absorption Performance Depending on Weight Ratio of Center Layer and Heat-Resistant Layer The composite fiber web of Example 1 and the composite fiber webs of Examples 2 and 3 were compared for sound absorption. The sound absorption in Test Example 2 was tested in the same manner as in Test Example 1.

The results of sound absorption testing of Example 1 and Examples 2 and 3 are shown in Table 4 below and FIG. 6.

TABLE 4

| | (FREQ [Hz]) | | | | | | | | | | | | | |
|---|---|---|---|---|---|---|---|---|---|---|---|---|---|---|
| | 500 | 630 | 800 | 1k | 1.25k | 1.6k | 2k | 2.5k | 3.15k | 4k | 5k | 6.3k | 8k | 10k |
| Example 2 | 0.50 | 0.68 | 0.86 | 0.91 | 0.98 | 0.99 | 1.02 | 1.02 | 1.02 | 1.00 | 1.00 | 1.02 | 1.05 | 1.00 |
| Example 3 | 0.53 | 0.70 | 0.88 | 0.94 | 0.99 | 0.99 | 1.00 | 1.03 | 1.02 | 1.04 | 1.01 | 1.00 | 1.03 | 1.04 |

Figure 6:
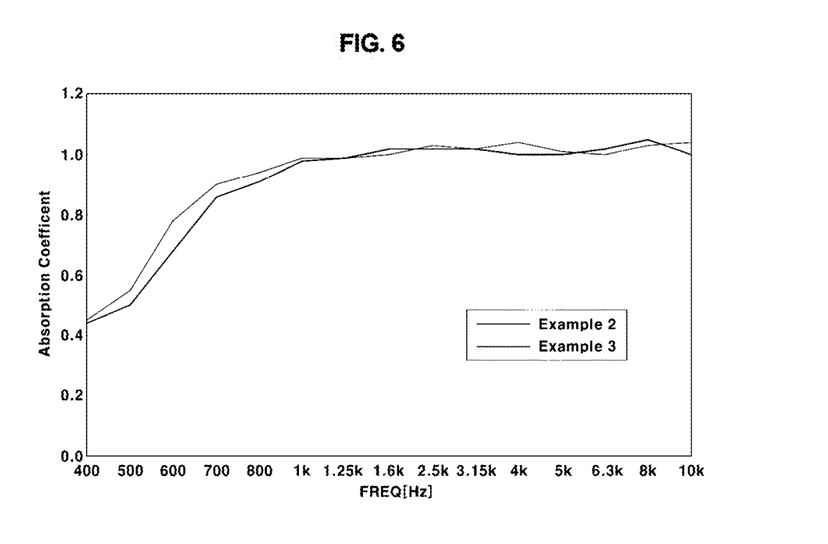
FIG. 6 is a graph showing the sound absorption coefficient depending on the frequency of Example 2 and Example 3 according to the present disclosure.

With reference to Table 4 and FIG. 6, compared to Example 1, in which the weight ratio of the first web (heat-resistant layer)/second web (center layer)/third web (heat-resistant layer) was 1:1:1, the weight ratio of Example 2 was 1:1.3:1, and thus, when the weight of the center layer was higher than that of the heat-resistant layer, the sound absorption was low at all frequencies. The weight ratio of Example 3 was 1.6:1:1.6, and thus, when the weight of the heat-resistant layer was higher than that of the center layer, the sound absorption was low at all frequencies, compared to Example 1. Meanwhile, in Examples 2 and 3, there was not much difference in sound absorption at all frequencies. Therefore, it was confirmed that when the weight ratio of the composite layer including the stack of first web (heat-resistant layer)/second web (center layer)/third web (heat-resistant layer) according to the present disclosure was close to 1:1:1, the sound absorption was superior.

Test Example 3—Measurement of Sound Absorption Performance Depending on Intrinsic Viscosity (IV) of PET Resin The composite fiber web of Example 1 and the composite fiber webs of Examples 4 and 5 were compared for sound absorption. The sound absorption in Test Example 3 was tested in the same manner as in Test Example 1.

The results of sound absorption testing of Example 1 and Examples 4 and 5 are shown in Table 5 below and FIG. 7.

TABLE 5

| | (FREQ [Hz]) | | | | | | | | | | | | | |
|---|---|---|---|---|---|---|---|---|---|---|---|---|---|---|
| | 500 | 630 | 800 | 1k | 1.25k | 1.6k | 2k | 2.5k | 3.15k | 4k | 5k | 6.3k | 8k | 10k |
| Example 1 | 0.55 | 0.72 | 0.88 | 0.95 | 0.98 | 0.99 | 1.02 | 1.08 | 1.03 | 1.05 | 1.05 | 1.06 | 1.04 | 1.07 |
| Example 4 | 0.55 | 0.73 | 0.87 | 0.94 | 0.97 | 0.99 | 1.00 | 1.03 | 1.02 | 1.04 | 1.01 | 1.00 | 1.03 | 1.04 |
| Example 5 | 0.53 | 0.71 | 0.87 | 0.93 | 0.97 | 0.98 | 1.00 | 1.01 | 1.02 | 1.02 | 1.03 | 0.97 | 0.98 | 1.00 |

Figure 7:
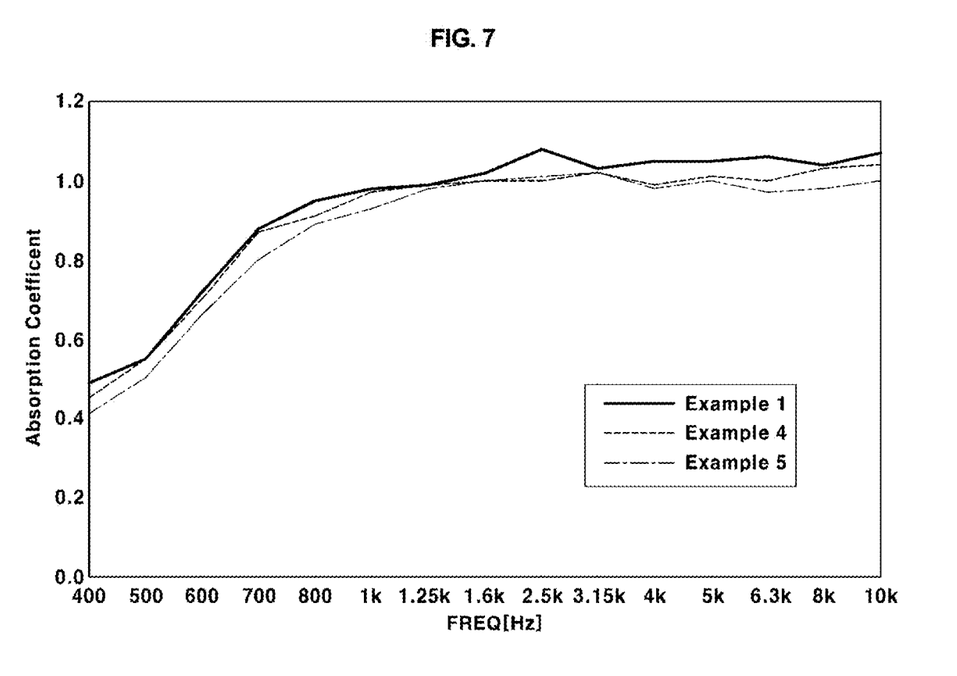
FIG. 7 is a graph showing the sound absorption coefficient depending on the frequency of Example 1 and Examples 4 and 5 according to the present disclosure.

With reference to Table 5 and FIG. 7, as the intrinsic viscosity (IV) of the PET resin was lowered to 0.43 upon manufacturing the PET fiber of the heat-resistant layer in the composite fiber webs, in which the average fiber diameter, weight and thickness were almost the same, sound absorption became vastly superior. Thus, when the intrinsic viscosity (IV) of the PET resin, which is the material for a PET fiber for manufacturing the heat-resistant layer of the composite fiber web, was close to 0.43, it was confirmed that the sound absorption of the composite fiber web manufactured using the same was excellent.

Although the preferred embodiments of the present disclosure have been disclosed for illustrative purposes, those skilled in the art will appreciate that various modifications are possible without departing from the scope and spirit of the present disclosure as disclosed in the accompanying claims, and such modifications should not be understood separately from the technical ideas or essential characteristics of the present disclosure.

What is claimed is:

1. A composite fiber web, comprising:
a center layer containing a carbon fiber; and
heat-resistant layers formed on one surface and another surface opposite to the one surface of the center layer, further comprising outer layers formed on each of the heat-resistant layers and including a nonwoven fabric,
wherein the heat-resistant layers comprise:
43 to 78 wt % of a polyethylene terephthalate fiber; and
20 to 55 wt % of a staple fiber;
wherein the polyethylene terephthalate fiber has a fiber diameter of 2 to 12 µm, an intrinsic viscosity (IV) of 0.43 to 0.5, and a melt flow rate of 150 to 1500 g/10 min, and
wherein the staple fiber has a thickness of 2.0 to 6.0 denier and a length of 18 to 68 mm.

2. The composite fiber web of claim 1, wherein a thickness ratio of the center layer and the heat-resistant layers is 1:1 to 1:4.

3. The composite fiber web of claim 1, wherein the composite fiber web comprises:
20 to 35 wt % of the center layer;
51 to 69 wt % of the heat-resistant layers; and
11 to 14 wt % of the outer layers.

4. The composite fiber web of claim 1, wherein the heat-resistant layers further comprises 2 to 5 wt % of an antioxidant.

5. The composite fiber web of claim 4, wherein the antioxidant comprises one selected from a group consisting of a phenol-based antioxidant, an amine-based antioxidant, a sulfur-based antioxidant, and a phosphorus-based antioxidant.

6. The composite fiber web of claim 1, wherein the staple fiber is at least one of a hollow staple fiber, a modified cross-section hollow fiber, or a modified cross-section fiber.

7. The composite fiber web of claim 1, having a weight of 580 to 690 g/m2, a thickness of 20 to 30 mm, an average fiber diameter of 2 to 15 µm, a heat-resistant temperature of 225 to 235° C., a specific surface area of 900 to 2,500 m2/g, and an average noise reduction coefficient of 0.92 to 0.94.

\* \* \* \* \*